US012722114B2

(12) United States Patent
Zhang et al.

(10) Patent No.: US 12,722,114 B2
(45) Date of Patent: Sep. 1, 2026

(54) PRESSURE SWING ADSORPTION DEVICE AND ROTARY VALVE THEREOF

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

(72) Inventors: Shengzhong Zhang, Liaoning (CN); Kai Qiao, Liaoning (CN); Yanpeng Zhang, Liaoning (CN); Dequan Fan, Liaoning (CN); Yang Yang, Liaoning (CN); Ming Gao, Liaoning (CN); Hongtao Wang, Liaoning (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

( * ) Notice: Subject to any disclaimer, the term of this patent is extended or adjusted under 35 U.S.C. 154(b) by 371 days.

(21) Appl. No.: 18/558,262

(22) PCT Filed: Apr. 29, 2022

(86) PCT No.: PCT/CN2022/090133

§ 371 (c)(1),
(2) Date: Oct. 31, 2023

(87) PCT Pub. No.: WO2022/237573

PCT Pub. Date: Nov. 17, 2022

(65) Prior Publication Data

US 2024/0367088 A1 Nov. 7, 2024

(30) Foreign Application Priority Data

May 8, 2021 (CN) ........................ 202110497464.8

(51) Int. Cl.
*F16K 11/074* (2006.01)
*B01D 53/04* (2006.01)
(Continued)

(52) U.S. Cl.
CPC ....... *B01D 53/0446* (2013.01); *B01D 53/047* (2013.01); *F16K 11/076* (2013.01); *B01D 2259/40005* (2013.01)

(58) Field of Classification Search
CPC ............................ F16K 11/074; F16K 11/085
See application file for complete search history.

(56) References Cited

U.S. PATENT DOCUMENTS 5,232,022 A 8/1993 Gougouyan
6,063,161 A * 5/2000 Keefer ................ B01D 53/047 96/144
7,867,320 B2 1/2011 Baksh et al.

FOREIGN PATENT DOCUMENTS

CN 101139088 A 3/2008
CN 201059373 Y 5/2008
(Continued)

*Primary Examiner* — Paul J Gray
(74) *Attorney, Agent, or Firm* — NKL Law; Allen Xue

(57) ABSTRACT

A rotary valve has a valve body and a valve sleeve disposed coaxially hermetically outside the valve body. The valve body has a first, a second, and a third group of flow channels, ports of these are disposed on a surface of the valve body. The valve sleeve is evenly opened with a plurality of through-holes, and an inner end of each through-hole is provided with a vertical groove extending up and down along an inner wall of the valve sleeve. The vertical groove is divided into three sections, each communicating with the ports of the first, the second, and the third group of flow (Continued)

channels, respectively. The first group of flow channels are in a working state, a switching valve is provided at the through-hole, which switches one group of the second group of flow channels and the third group of flow channels into the working state.

18 Claims, 6 Drawing Sheets

(51) Int. Cl.
*B01D 53/047* (2006.01)
*F16K 11/076* (2006.01)

(56) References Cited

FOREIGN PATENT DOCUMENTS

| | | | |
|---|---|---|---|
| CN | 101446361 | A | 6/2009 |
| CN | 201836452 | U | 5/2011 |
| CN | 102913494 | A | 2/2013 |
| CN | 103953752 | A | 7/2014 |
| CN | 104196790 | A | 12/2014 |
| CN | 105879576 | A | 8/2016 |
| CN | 107355564 | A | 11/2017 |
| CN | 206874888 | U | 1/2018 |
| EP | 0832679 | A2 | 4/1998 |
| KR | 200328337 | Y1 | 9/2003 |
| TW | I328468 | B | 8/2010 |

* cited by examiner

PRESSURE SWING ADSORPTION DEVICE AND ROTARY VALVE THEREOF

TECHNICAL FIELD

The invention relates to the technical field of pressure swing adsorption separation, in particular to a pressure swing adsorption device and a rotary valve thereof.

BACKGROUND

With the increasing demand for hydrogen energy source, more requirements are placed on hydrogen purification technology. The traditional pressure swing adsorption technology is limited by the limitation of the program-controlled valve groups, and there are shortcomings such as a long adsorption cycle (generally 10 minutes for one adsorption, pressure equalization, desorption, pressurization cycle), and large footprint. Especially in the case of miniaturized hydrogen supply, such as hydrogen refueling stations, higher requirements are placed on the integration of hydrogen purification devices.

Patent document CN101139088A proposes a design concept of a rotary molecular sieve miniature pressure swing adsorption oxygen generator. However, this solution requires rotation of a tower filled with molecular sieves, which limits the scaling-up and operational flexibility of the device. In fact, it can be found through analysis that the rotating structure proposed in this patent document cannot realize the pressure swing adsorption process.

Patent document CN101446361A discloses a rotary valve having a rotor and a stator, the rotary valve utilizes at least one compression spring to provide contact between the rotor and the stator. The spring is configured to resist the pressure that separates the rotor and stator and reduces the amount of torque required to rotate the rotor within the valve while preventing leakage between the rotor and stator. Although using the rotary valve as a rotating part does not require the rotation of the adsorption tower, it is generally only used for non-long-term projects because maintenance and replacement require shutdown operations.

In long-term projects, on the one hand, the long-time operation of the rotating parts will cause wear, causing gas leakage problems, at this time, it is often necessary to shutdown for replacement; on the other hand, crude gas may fluctuate, when heavy components of crude gas increase, it is necessary to add an internal gas purge step or even a product gas purge step in order to achieve complete desorption of an adsorbent bed. When component of the crude gas is good, there is no need to add an auxiliary regeneration step. The pressure swing adsorption device using a rotary valve in the prior art has problems such as poor crude gas adaptability and limited process adjustment range, so it is difficult to apply to long-term projects.

The information disclosed in this Background section is only for enhancing understanding of the general background of the present invention and should not be taken as an acknowledgment or implication in any form that the information constitutes the prior art that is well known to those skilled in the art.

SUMMARY

One of the objectives of the present invention is to provide a pressure swing adsorption device and a rotary valve thereof, so as to improve the problems such as lack of operational flexibility and inability to adapt to crude gas fluctuations, etc., in the prior art rotary valve and pressure swing adsorption device.

Another object of the present invention is to provide a pressure swing adsorption device and a rotary valve thereof, so as to improve the problems such as inconvenience of maintenance and replacement of the rotary valve and being not suitable for long-term projects in the prior art, etc.

To achieve the above objects, according to a first aspect of the present invention, the present invention provides a rotary valve, comprising:

- a valve body provided with a first group of flow channels, a second group of flow channels and a third group of flow channels, ports of the first group of flow channels, the second group of flow channels and the third group of flow channels are disposed on a surface of the valve body; and
- a valve sleeve sleeved coaxially hermetically outside the valve body, and the valve sleeve is evenly opened with a plurality of through-holes, and an inner end of each through-hole is provided with a vertical groove extending up and down along an inner wall of the valve sleeve, the vertical groove is divided into three sections along the vertical direction, which communicate with the ports of the first group of flow channels, the second group of flow channels and the third group of flow channels, respectively, the first group of flow channels are in a working state, a switching valve is provided at the through-hole, and the switching valve switches one group of the second group of flow channels and the third group of flow channels into the working state,
- the valve body rotates around a rotation axis relative to the valve sleeve, so that the plurality of through-holes communicate with the ports of the one group of the second group of flow channels and the third group of flow channels that is in the working state and the first group of flow channels by means of a predetermined combination to achieve different process sequences, and each through-hole at most communicates with ports of the first group of flow channels, one group of the second group of flow channels or the third group of flow channels.

Preferably, the second group of flow channels includes a plurality of flow channels, and the third group of flow channels includes a plurality of flow channels.

Preferably, the valve body is composed of at least two valve blocks, the at least two valve blocks are detachably connected, and the second group of flow channels and the third group of flow channels are arranged in different valve blocks.

Preferably, the second group of flow channels and the third group of flow channels correspond to the same or different process sequences.

Preferably, one port of the first group of flow channels is located at the center of the top surface of the valve body, and the other port of the first group of flow channels is located on the sidewall of the valve body and is provided with an arc-shaped groove extending horizontally along the outer sidewall of the valve body.

According to a second aspect of the present invention, the present invention provides a pressure swing adsorption device, comprising:

- a crude gas valve which is the rotary valve according to claim 1, ports of the crude gas valve include a feed port arranged at the center of the top surface and a discharge port arranged at the center of the bottom surface;

a product gas valve which is the rotary valve according to claim 1, ports of the product gas valve include a product gas port that is arranged at the center of top surface, and a valve body of the product gas valve and a valve body of the crude gas valve rotate synchronously according to a predetermined sequence; and a plurality of adsorption towers with bottom gas pipes and top gas pipes, the bottom gas pipes communicate respectively with through-holes of the crude gas valve, and the top gas pipes communicate respectively with through-holes of the product gas valve.

Preferably, the first group of flow channels of the product gas valve is a product gas channel, one port of which is the product gas port, and the other port is located on the sidewall of the valve body of the product gas valve and is provided with a first arc-shaped groove extending horizontally along the outer sidewall of the valve body of the product gas valve, the first arc-shaped groove is used to guide the product gas of corresponding adsorption tower to flow between the product gas port and the through-hole aligned with the first arc-shaped groove;

the second group of flow channels of the product gas valve are first pressure equalization channels, both ports of which are arranged on the sidewall of the valve body of the product gas valve, and the first pressure equalization channels are used to guide the product gas to flow between two through-holes aligned with the two ports of the first pressure equalization channels; and the third group of flow channels of the product gas valve are second pressure equalization channels, both ports of which are arranged on the sidewall of the valve body of the product gas valve, and the second pressure equalization channels are used to guide the product gas to flow between two through-holes aligned with the two ports of the second pressure equalization channels.

Preferably, the number of the first pressure equalization channels is 2 to 10, and the angle between adjacent first pressure equalization channels is 10° to 45°; the number of the second pressure equalization channels is 2 to 10, the angle between the adjacent second pressure equalization channels is 10° to 45°; the arrangement of the first pressure equalization channels is the same as or different from the arrangement of the second pressure equalization channels.

Preferably, the valve body of the product gas valve is composed of an upper valve block, a middle valve block and a lower valve block, the product gas channel is arranged in the middle valve block and passes through the upper valve block, the first pressure equalization channels and the second pressure equalization channels are respectively arranged in the upper valve block and the lower valve block, and the upper valve block and the lower valve block are detachably connected with the middle valve block.

Preferably, the first group of flow channels of the crude gas valve is a crude gas channel, one port of which is the feed port, and the other port is located on the sidewall of the valve body and is provided with a second arc-shaped groove extending horizontally along the outer sidewall of the valve body of the crude gas valve, the second arc-shaped groove is used to guide the feed gas flow into the through-hole aligned with the second arc-shaped groove, the second arc-shaped groove has the same radian as the first arc-shaped groove and is vertically opposite to the first arc-shaped groove;

the second group of flow channels of the crude gas valve is a first exhaust channel, one port of which is the discharge port, and the other port is a first exhaust gas inlet located on the sidewall of the valve body of the crude gas valve, the first exhaust channel is used to guide exhaust gas from the through-hole aligned with the first exhaust gas inlet to the discharge port; and the third group of flow channels of the crude gas valve is a second exhaust channel, which forms an F-shape with the first exhaust channel, one port of the second exhaust channel is the discharge port, and the other port is a second exhaust gas inlet located on the sidewall of the valve body of the crude gas valve, and the second exhaust channel is used to guide the exhaust gas from the through-hole aligned with the second exhaust gas inlet to the discharge port.

Preferably, the first exhaust gas inlet and/or the second exhaust gas inlet are provided with a third arc-shaped groove extending horizontally along the outer sidewall of the valve body of the crude gas valve, and the third arc-shaped groove is used to guide the exhaust gas from the through-hole aligned with the third arc-shaped groove to discharge port.

Preferably, the radians of the first arc-shaped groove and the second arc-shaped groove are $\pi/6\text{~}5\pi/6$.

Preferably, the number of the adsorption towers is greater than or equal to 4.

Preferably, the predetermined sequence is a process sequence of pressure swing adsorption.

Preferably, the valve body of the product gas valve and the valve body of the crude gas valve rotate at a constant speed or a stepped speed.

According to a third aspect of the present invention, the present invention provides a method for recovering component with weaker adsorbability from a gas mixture using the pressure swing adsorption device described above, the plurality of adsorption towers comprising a first adsorption tower, a second adsorption tower, a third adsorption tower and a fourth adsorption tower, the method can be selectively operated in one of a first process sequence and a second process sequence.

Preferably, the first process sequence includes the following sequences:

Sequence 1: the first adsorption tower is in an adsorption step, the second adsorption tower is in a first pressurization step, the third adsorption tower is in a reverse-discharge regeneration step, and the fourth adsorption tower is in a first depressurization step;

Sequence 2: the first adsorption tower is in the adsorption step, the second adsorption tower is in a cut-out state without performing any operation, the third adsorption tower is in a purge regeneration step, and the fourth adsorption tower is in a purge step;

Sequence 3: the first adsorption tower is in an adsorption+pressurization step, the second adsorption tower is in an adsorption-ready pressurization step, the third adsorption tower is in a second pressurization step, and the fourth adsorption tower is in a second depressurization step;

Sequence 4: the first adsorption tower is in the first depressurization step, the second adsorption tower is in the adsorption step, the third adsorption tower is in the first pressurization step, and the fourth adsorption tower is in the reverse-discharge regeneration step;

Sequence 5: the second adsorption tower is in the adsorption step, the third adsorption tower is in the cut-out state without performing any operation, the fourth adsorption tower is in the purge regeneration step, and the first adsorption tower is in the purge step;

Sequence 6: the first adsorption tower is in the second depressurization step, the second adsorption tower is in the adsorption+pressurization step, the third adsorption tower is in the adsorption-ready pressurization step, and the fourth adsorption tower is in the second pressurization step;

Sequence 7: the first adsorption tower is in the reverse-discharge regeneration step, the second adsorption tower is in the first depressurization step, the third adsorption tower is in the adsorption step, and the fourth adsorption tower is in the first pressurization step;

Sequence 8: the third adsorption tower is in the adsorption step, the fourth adsorption tower is in the cut-out state without performing any operation, the first adsorption tower is in the purge regeneration step, and the second adsorption tower is in the purge step;

Sequence 9: the first adsorption tower is in the second pressurization step, the second adsorption tower is in the second depressurization step, the third adsorption tower is in the adsorption+pressurization step, and the fourth adsorption tower is in the adsorption-ready pressurization step;

Sequence 10: the first adsorption tower is in the first pressurization step, the second adsorption tower is in the reverse-discharge regeneration step, the third adsorption tower is in the first depressurization step, and the fourth adsorption tower is in the adsorption step;

Sequence 11: the fourth adsorption tower is in the adsorption step, the first adsorption tower is in the cut-out state without performing any operation, the second adsorption tower is in the purge regeneration step, and the third adsorption tower is in the purge step;

Sequence 12: the first adsorption tower is in the adsorption-ready pressurization step, the second adsorption tower is in the second pressurization step, the third adsorption tower is in the second depressurization step, and the fourth adsorption tower is in the adsorption+pressurization step.

Preferably, the second process sequence includes the following sequences:

Sequence 1: the first adsorption tower is in an adsorption step, the second adsorption tower is in a first pressurization step, the third adsorption tower is in a reverse-discharge regeneration step, and the fourth adsorption tower is in a first depressurization step;

Sequence 2: the first adsorption tower is in the adsorption step, the second adsorption tower, the third adsorption tower and the fourth adsorption tower are all in a cut-out state without performing any operation;

Sequence 3: the first adsorption tower is in an adsorption+pressurization step, the second adsorption tower is in an adsorption-ready pressurization step, the third adsorption tower is in a second pressurization step, and the fourth adsorption tower is in a second depressurization step;

Sequence 4: the first adsorption tower is in the first depressurization step, the second adsorption tower is in the adsorption step, the third adsorption tower is in the first pressurization step, and the fourth adsorption tower is in a reverse-discharge regeneration step;

Sequence 5: the second adsorption tower is in the adsorption step, the first adsorption tower, the third adsorption tower and the fourth adsorption tower are all in the cut-out state without performing any operation;

Sequence 6: the first adsorption tower is in the second depressurization step, the second adsorption tower is in the adsorption+pressurization step, the third adsorption tower is in the adsorption-ready pressurization step, and the fourth adsorption tower is in the second pressurization step;

Sequence 7: the first adsorption tower is in the reverse-discharge regeneration step, the second adsorption tower is in the first depressurization step, the third adsorption tower is in the adsorption step, and the fourth adsorption tower is in the first pressurization step;

Sequence 8: the third adsorption tower is in the adsorption step, the first adsorption tower, the second adsorption tower and the fourth adsorption tower are all in the cut-out state without performing any operation;

Sequence 9: the first adsorption tower is in the second pressurization step, the second adsorption tower is in the second depressurization step, the third adsorption tower is in the adsorption+pressurization step, and the fourth adsorption tower is in the adsorption-ready pressurization step;

Sequence 10: the first adsorption tower is in the first pressurization step, the second adsorption tower is in the reverse-discharge regeneration step, the third adsorption tower is in the first depressurization step, and the fourth adsorption tower is in the adsorption step;

Sequence 11: the fourth adsorption tower is in the adsorption step, the first adsorption tower, the second adsorption tower and the third adsorption tower are all in the cut-out state without performing any operation;

Sequence 12: the first adsorption tower is in the adsorption-ready pressurization step, the second adsorption tower is in the second pressurization step, the third adsorption tower is in the second depressurization step, and the fourth adsorption tower is in the adsorption+pressurization step.

Compared with the prior art, the present invention has one or more of the following beneficial effects:

1. The present invention can switch the working state of the groups of flow channels by matching the valve body of the rotary valve with the valve sleeve structure design and the flow channel layout, thereby realizing the online switching of different sequence processes and meeting the demand for improving process conditions due to on-site crude gas fluctuations, which improves the flexibility of production; it can also switch to other groups of flow channels in time when a group of flow channels are worn out, so as to prolong the service life of the device.
2. Through matching the split design of the rotary valve with the layout of the groups of flow channels that can switch the working state, the online replacement and maintenance of the valve block (and the corresponding groups of flow channels) can be realized, which ensures the online operation rate of the rotary valve and improves the production efficiency, and is especially suitable for long-term projects.
3. The pressure swing adsorption device of the present invention adopts a highly integrated rotary valve design instead of a plurality of program-controlled valve groups of conventional pressure swing adsorption, which can realize a pressure swing adsorption process with an adsorption cycle of 10 seconds to 10 minutes, thereby saving material consumption; at the same time, in the pressure swing adsorption device of the present invention, only the valve body of the rotary valve is a rotating part, and the adsorption tower and other pipes are arranged stationary, which further solves the problem of device integration.

The above description is only an overview of the technical solution of the present invention. In order to better understand the technical means of the present invention and implement it according to the contents of the description, and to make the above and other objects, technical features and advantages of the present invention more understandable, one or more preferred embodiments are listed below, and detailed descriptions are given below with reference to the accompanying drawings.

DESCRIPTION OF MAIN REFERENCE NUMBERS

Figure 1:
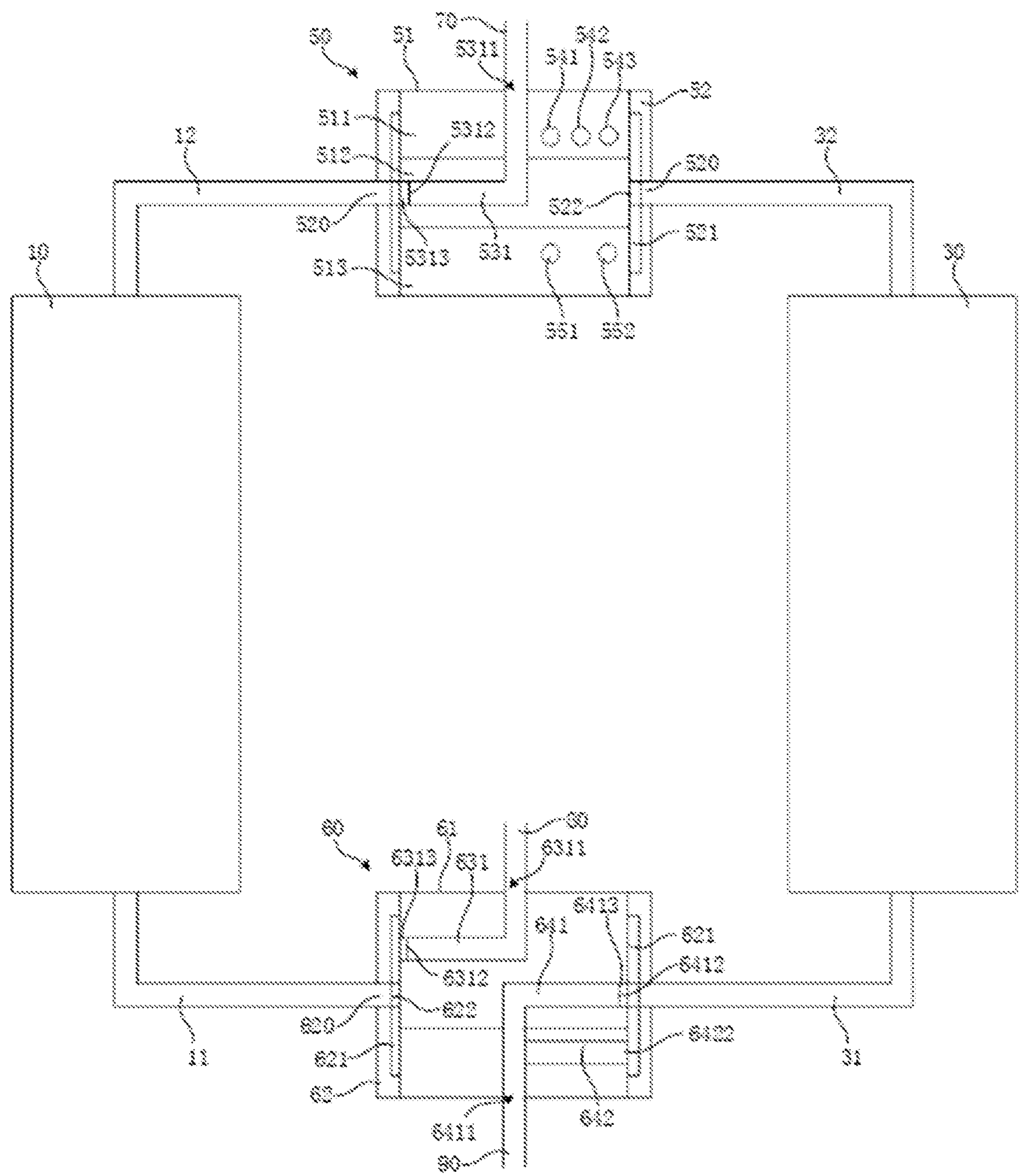
FIG. 1 is a cross-sectional structure schematic diagram of a pressure swing adsorption device according to the present invention.

10, 20, 30, 40—adsorption tower,
11, 21, 31, 41—bottom gas pipe,
12, 22, 32, 42—top gas pipe,
50—product gas valve,
51—valve body,
511—upper valve block,
512—middle valve block,
513—lower valve block,
52—valve sleeve,
520—through-hole,
521—vertical groove,
522—switching valve,
531—product gas channel,
5311—product gas port,
5312—port,
5313—first arc-shaped groove,
541, 542, 543—first pressure equalization channels,
551, 552—second pressure equalization channels,
60—crude gas valve,
61—valve body,
62—valve sleeve,
620—through-holee,
621—vertical groove,
622—switching valve,
631—crude gas channel,
6311—feed port,
6312—port,
6313—second arc-shaped groove,
641—first exhaust channel,
6411—discharge port,
6412—first exhaust gas inlet,
6413—third arc-shaped groove,
642—second exhaust channel,
6422—second exhaust gas inlet,
70—product collection pipe,
80—crude gas supply pipe,
90—exhaust gas collection pipe.

DETAILED DESCRIPTION OF EMBODIMENTS

Specific embodiments of the present invention will be described in detail below in conjunction with the accompanying drawings, but it should be understood that the protection scope of the present invention is not limited by the specific embodiments.

Unless expressly stated otherwise, throughout the specification and claims, the term "comprise" or variations thereof such as "includes" or "including" and the like will be understood to include the stated elements or constituent parts, but not exclude other elements or other constituent parts.

Herein, for the convenience of description, spatially relative terms, such as "below", "beneath", "lower", "on", "above", "upper", etc., may be used to describe the relationship between one element or feature and another element or feature in the drawings. It should be understood that the spatially relative terms are intended to encompass different orientations of the item in use or operation in addition to the orientation depicted in the figures. For example, if an item in the figures is turned over, elements described as "below" or "beneath" other elements or features would then be oriented "above" the elements or features. Thus, the exemplary term "below" can encompass both an orientation of below and above. Items may be otherwise oriented (rotated 90 degrees or otherwise) and the spatially relative terms used herein should be interpreted accordingly.

Herein, the terms "first", "second", etc., are used to distinguish two different elements or parts, and are not used to limit specific positions or relative relationships. In other words, in some embodiments, the terms "first", "second", etc., may also be interchanged with each other.

FIG. 1 shows a pressure swing adsorption device according to the present invention, which includes a product gas valve 50 and a crude gas valve 60, a valve body 51 of the product gas valve 50 and a valve body 61 of the crude gas valve 60 are coaxially, synchronously rotated according to a predetermined sequence. The pressure swing adsorption device of this embodiment is provided with four adsorption towers 10, 20, 30 and 40. Correspondingly, the product gas valve 50 and the crude gas valve 60 each have four through-holes. It should be understood that the pressure swing adsorption device can be provided with any number of adsorption towers, as long as the number of adsorption towers corresponds to the number of through-holes of the product gas valve 50 and the crude gas valve 60, without departing from the scope of the present invention.

Embodiment 1

Figures 2, 3:
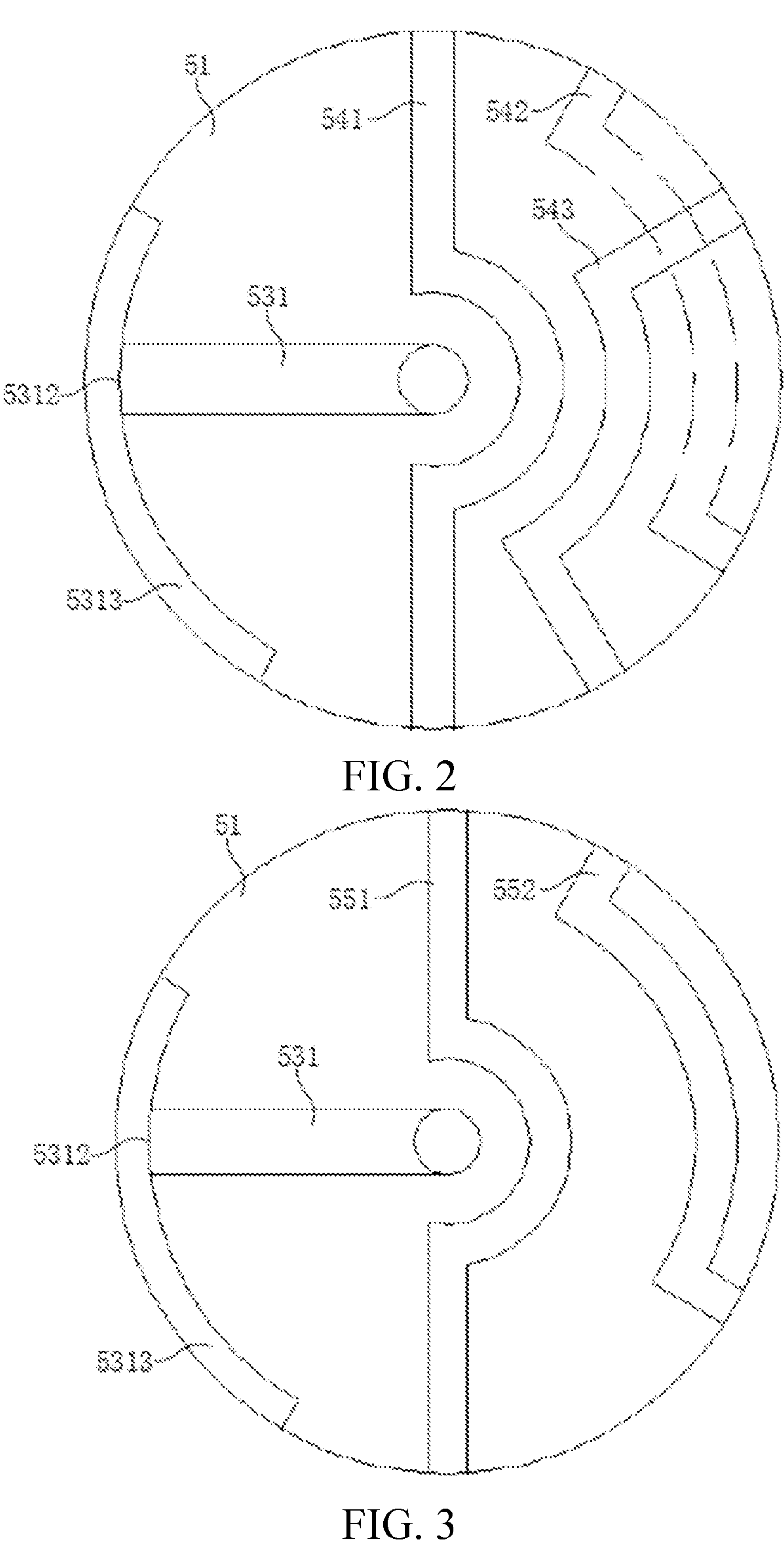
FIG. 2 is a schematic diagram of flow channel arrangement of the valve body of the product gas valve in the first process sequence according to one embodiment of the present invention.
FIG. 3 is a schematic diagram of flow channel arrangement of the valve body of the product gas valve in the second process sequence according to one embodiment of the present invention.

As shown in FIGS. 1-3, the product gas valve 50 is a rotary valve according to Embodiment 1 of the present invention, and the product gas valve 50 includes a valve body 51 and a valve sleeve 52. The valve body 51 is housed in the inner cavity of the valve sleeve 52. The valve body 51 is a cylindrical structure, and the valve body 51 is provided with three groups of flow channels therein: a first group of flow channels, a second group of flow channels and a third group of flow channels. Ports of the first group of flow channels, the second group of flow channels and the third group of flow channels are arranged on the surface of the valve body 51. The valve sleeve 52 is sleeved coaxially hermetically outside the valve body 51. The valve sleeve 52 is evenly opened with a plurality of through-holes 520. The inner end of each through-hole 520 is provided with a vertical groove 521 extending up and down along the inner wall of the valve sleeve. The vertical groove 521 is divided into three sections along the vertical direction, corresponding to the ports of the first group of flow channels, the second group of flow channels and the third group of flow channels, respectively. It should be understood that the valve body 51 and the internal cavity of the valve sleeve 52 may be columnar shaped with an oval cross section, conical shaped, or any other shape with a circular cross section perpendicular to the rotation axis of the rotary valve. A seal is housed between the valve body 51 and the inner cavity of the valve sleeve 52, such as a packing, an O-ring, a gasket, or other elastomeric material (not shown) suitable for preventing gas from flowing between the valve body 51 and the valve sleeve 52. The packing, O-ring, gasket or other elastomeric material should have a low coefficient of friction to allow hermetically sliding contact between this material and the outer surface of the valve body 51 and/or the inner surface of the inner cavity of the valve sleeve 52.

A switching valve 522 is provided at the through-hole 520, and the switching valve 522 switches one group of the second group of flow channels and the third group of flow channels into a working state. The valve body 51 can rotate around the axis relative to the valve sleeve 52, so that the plurality of through-holes 520 communicate with the ports of the one group of the second group of flow channels and the third group of flow channels that is in the working state by means of a combination to change the process operation mode. Each through-hole 520 at most communicates with one port of the valve body 51.

The three groups of flow channels of the product gas valve 50 include one normally open channel group (the first group of flow channels) and two switching channel groups (the second group of flow channels and the third group of flow channels). The first group of flow channels includes a product gas channel 531. The two ports of the product gas channel 531 are respectively a product gas port 5311 located at the center of the top surface of the valve body 51 and a port 5312 located on the sidewall of the valve body 51. The port 5312 is provided with a first arc-shaped groove 5313 which extends horizontally along the outer sidewall of the valve body. Wherein the second group of flow channels includes three first pressure equalization channels 541, 542 and 543, and the ports of the first pressure equalization channels 541, 542 and 543 are all arranged on the sidewall of the valve body 51; the third group of flow channels includes two second pressure equalization channels 551 and 552, and the ports of the second pressure equalization channels 551 and 552 are all arranged on the sidewall of the valve body 51. In this embodiment, the process sequences corresponding to the two switching groups of flow channels are different. It should be understood that the present invention is not limited to the disclosed specific groups of flow channels. Those skilled in the art can select any suitable number and structure of groups of flow channels as needed.

In this embodiment, the valve body 51 is composed of an upper valve block 511, a middle valve block 512 and a lower valve block 513. The product gas channel 531 is arranged in the middle valve block 512 and passes upwards through the upper valve block 511. The first pressure equalization channels 541, 542 and 543 are arranged in the upper valve block 511, and the second pressure equalization channels 551 and 552 are arranged in the lower valve block 513. Both the upper valve block 511 and the lower valve block 513 are detachable. After the switching valve 522 is switched to where the middle valve block 512 and the third group of flow channels in the lower valve block 513 are in the working state, the upper valve block 511 can be disassembled; after the switching valve 522 is switched to the second group of flow channels in the upper valve block 511 and the middle valve block 512 are in the working state, the lower valve block 513 can be disassembled. Regardless whether the upper valve block 511 or the lower valve block 513 is disassembled, the product gas channel 531 can maintain in the working state, so there is no need to shutdown.

Embodiment 2

Figures 4, 5:
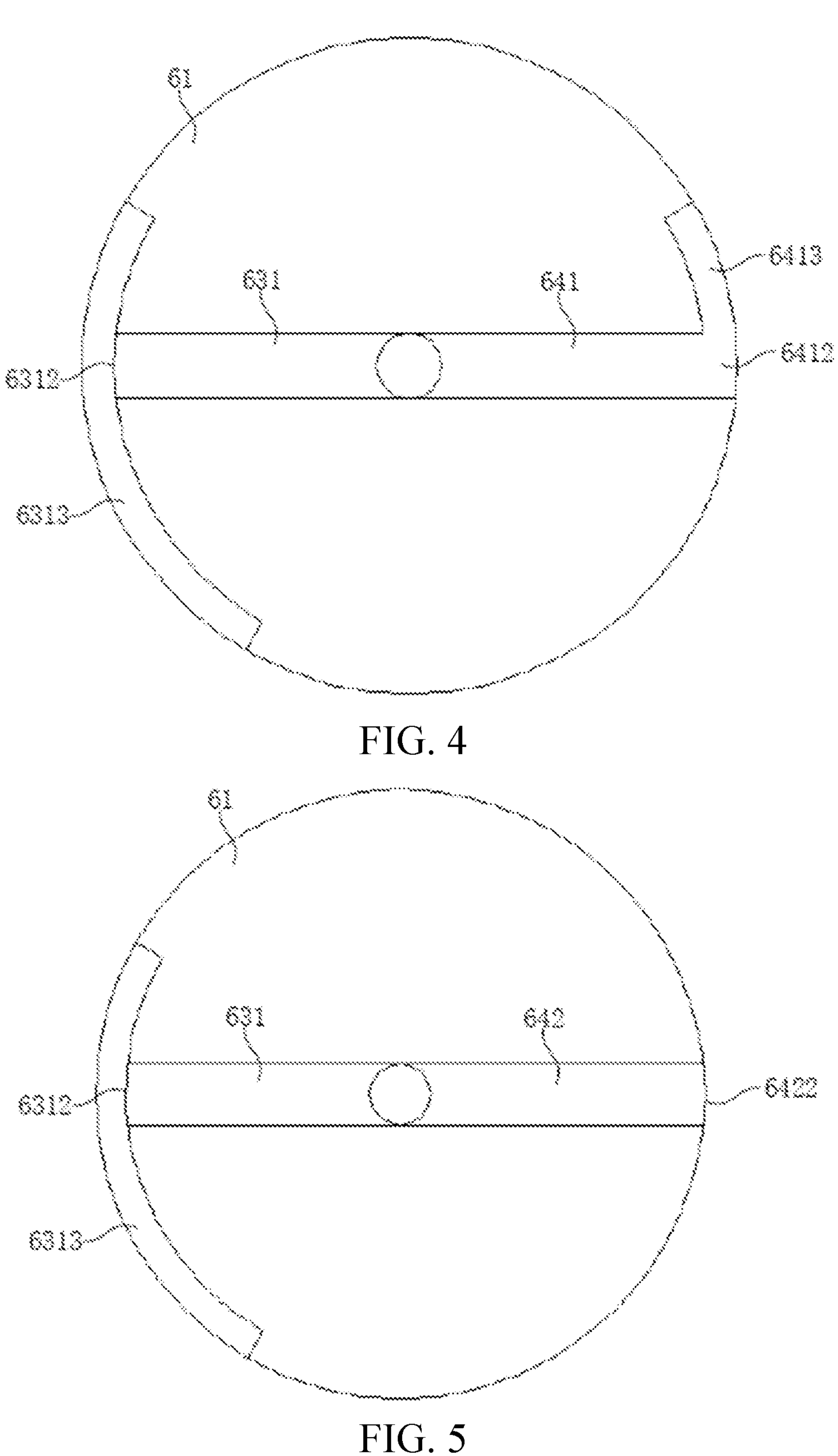
FIG. 4 is a schematic diagram of flow channel arrangement of the valve body of the crude gas valve in the first process sequence according to one embodiment of the present invention.
FIG. 5 is a schematic diagram of flow channel arrangement of the valve body of the crude gas valve in the second process sequence according to one embodiment of the present invention.

As shown in FIGS. 1, 4 and 5, the crude gas valve 60 is a rotary valve according to Embodiment 2 of the present invention, and the crude gas valve 60 includes a valve body 61 and a valve sleeve 62. The valve body 61 is housed in the inner cavity of the valve sleeve 62. The valve body 61 is a cylindrical structure, and the valve body 61 is provided with three groups of flow channels therein: a first group of flow channels, a second group of flow channels and a third group of flow channels. Ports of the first group of flow channels, the second group of flow channels and the third group of flow channels are arranged on the surface of the valve body 61. The valve sleeve 62 is sleeved coaxially hermetically outside the valve body 61. The valve sleeve 62 is evenly opened with a plurality of through-holes 620. The inner end of each through-hole 620 is provided with a vertical groove 621 extending up and down along the inner wall of the valve sleeve. The vertical groove 621 is divided into three sections along the vertical direction, corresponding to the ports of the first group of flow channels, the second group of flow channels and the third group of flow channels, respectively. It should be understood that the valve body 61 and the internal cavity of the valve sleeve 62 may be columnar shaped with an oval cross section, conical shaped, or any other shape with a circular cross section perpendicular to the rotation axis of the rotary valve. A seal is housed between the valve body 61 and the interior cavity of the valve sleeve 62, such as a packing, O-ring, gasket, or other elastomeric material (not shown) suitable to prevent gas from flowing between the valve body 61 and the valve sleeve 62. The packing, O-ring, gasket or other elastomeric material should have a low coefficient of friction to allow hermetically sliding contact between this material and the outer surface of the valve body 61 and/or the inner surface of the inner cavity of the valve sleeve 62.

A switching valve 622 is provided at the through-hole 620, and the switching valve 622 switches one group of the second group of flow channels and the third group of flow channels into the working state. The valve body 61 can rotate around the axis relative to the valve sleeve 62, so that the plurality of through-holes 620 communicate with the ports of the one group of the second group of flow channels and the third group of flow channels that is in the working state by means of a combination to change the process operation mode. Each through-hole 620 at most communicates with one port of the valve body 61.

The three groups of flow channels of the crude gas valve 60 include one normally open channel group (the first group of flow channels) and two switching channel groups (the second group of flow channels and the third group of flow channels). The first group of flow channels includes a crude gas channel 631, and the two ports of the crude gas channel 631 are respectively a feed port 6311 located at the center of the top surface of the valve body 61 and a port 6312 located on the sidewall of the valve body 61. The port 6312 is provided with a second arc-shaped groove 6313 extends horizontally along the outer sidewall of the valve body. The second group of flow channels includes a first exhaust channel 641, and the two ports of the first exhaust channel 641 are respectively a discharge port 6411 located at the center of the bottom surface of the valve body 61 and a first exhaust gas inlet 6412 located on the sidewall of the valve body 61. The first exhaust gas inlet 6412 is provided with a third arc-shaped groove 6413 extending horizontally along the outer sidewall of the valve body. The third group of flow channels includes a second exhaust channel 642, which forms an F-shape with the first exhaust channel 641. The two ports of the second exhaust channel 642 are respectively the discharge port 6411 located at the center of the bottom surface of the valve body 61 and a second exhaust gas inlet 6422 located on the sidewall of the valve body 61. In this embodiment, the process sequences corresponding to the two switching groups of flow channels are different. It should be understood that the present invention is not limited to the disclosed specific groups of flow channels. Those skilled in the art can select any suitable number and structure of groups of flow channels as needed.

Referring to FIGS. 1 to 8, the pressure swing adsorption device includes the product gas valve 50 and the crude gas valve 60, and the four adsorption towers 10, 20, 30 and 40. The bottom gas pipes 11, 21, 31 and 41 of the adsorption towers 10, 20, 30 and 40 communicate with the through-hole 620 of the crude gas valve 60, respectively, and the top gas pipes 12, 22, 32 and 42 communicate with the through-hole 520 of the product gas valve 50, respectively. The product gas port 5311 of the product gas valve 50 is connected to the product collection pipe 70, the feed port 6311 of the crude gas valve 60 communicates with the crude gas supply pipe 80, and the discharge port 6411 communicates with the exhaust gas collection pipe 90. The first arc-shaped groove 5313 and the second arc-shaped groove 6313 have the same radian and are strictly opposite in up-down direction.

In this embodiment, the radians of the first arc-shaped groove 5313 and the second arc-shaped groove 6313 are both $\pi/2$, and the radian of the third arc-shaped groove 6413 is $\pi/6$. The angle between the two ports of the first equalization channel 541 of the product gas valve 50 is 180°, the angle between the two ports of the first equalization channel 542 is 90°, the angle between the two ports of the first equalization channel 543 is 90°, the angle between the adjacent first equalization channels is 30°; the angle between the two ports of the second equalization channel 551 is 180°, the angle between the two ports of the second pressure equalization channels 552 is 90°, and the angle between adjacent second equalization channels is 60°. It should be understood that the radians of the first arc-shaped groove 5313, the second arc-shaped groove 6313 and the third arc-shaped groove 6413, and the angle between the two ports of the respective first pressure equalization channels 541, 542, 543 and second pressure equalization channels 551, 552 of the product gas valve 50 may take any other suitable value without departing from the scope of the present invention. Those skilled in the art can select a suitable value according to the specific number of adsorption towers and specific process sequence requirements.

In this embodiment, the first arc-shaped groove 5313 is used to guide the product gas of at least one adsorption tower to flow between the product gas port 5311 and the through-hole 520 aligned with the first arc-shaped groove 5313; the first equalization channel 541, 542 and 543 are used to guide the product gas to flow between two through-holes 520 aligned with the two ports 520 of the first pressure equalization channels 541, 542 and 543; the second pressure equalization channels 551 and 552 are used to guide the product gas to flow between the two through-holes 520 aligned with the two ports of the second pressure equalization channels 551 and 552.

In this embodiment, the second arc-shaped groove 6313 is used to guide the crude gas flow into the through-hole 620 aligned with the second arc-shaped groove 6313; the first exhaust channel 641 is used to guide the exhaust gas from the through-hole 620 aligned with the first exhaust gas inlet 6412 to the discharge port 6411; the second exhaust channel 642 is used to guide the exhaust gas from the through-hole 620 aligned with the second exhaust gas inlet 6422 to the discharge port 6411; the third arc-shaped groove 6413 is used to guide the exhaust gas from the through-hole 620 aligned with the third arc-shaped groove 6413 to the discharge port 6411.

The pressure swing adsorption device of this embodiment can realize two pressure swing adsorption process sequences: the first process sequence and the second process sequence. During the working process, only the valve body 51 of the product gas valve 50 and the valve body 61 of the crude gas valve 60 rotate synchronously, and the other components are all stationary.

Figure 6:
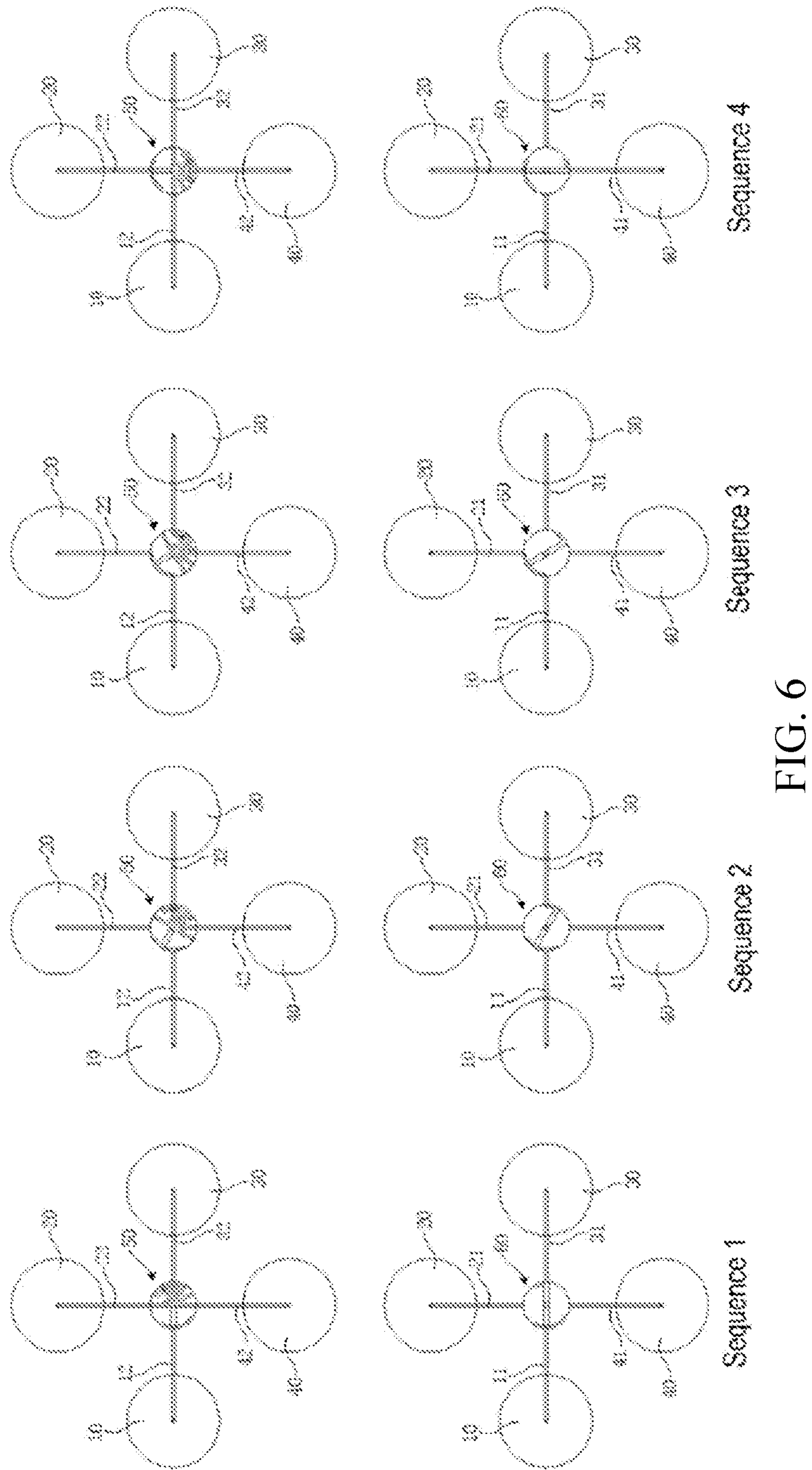
FIG. 6 is a schematic diagram of the working process of the pressure swing adsorption device according to one embodiment of the present invention, wherein the pressure swing adsorption device is switched to the first process sequence, and structures of the valve sleeve of the product gas valve and the crude gas valve are not shown.

The working process of the pressure swing adsorption device of this embodiment using the first process sequence will be described below with reference to FIG. 6 and Table 1.

The switching valve 522 of the product gas valve 50 causes the product gas channel 531 and the first pressure equalization channels 541, 542 and 543 to be in the working state, and the switching valve 622 of the crude gas valve 60 causes the crude gas channel 631 and the first exhaust channel 641 to be in the working state. Each adsorption tower undergoes the steps of adsorption, first pressure equalization, purge regeneration, second pressure equalization, reverse-discharge regeneration (or countercurrent regeneration) and pressurization in one process cycle of the first process sequence. The valve body 51 of the product gas valve 50 and the valve body 61 of the crude gas valve 60 rotate synchronously in the clockwise direction with a sequence interval of 30°.

TABLE 1

Steps of each adsorption tower 10, 20, 30, 40 in each step sequence of the first process sequence

| adsorption | sequence | | | | | | | | | | | |
|---|---|---|---|---|---|---|---|---|---|---|---|---|
| tower | 1 | 2 | 3 | 4 | 5 | 6 | 7 | 8 | 9 | 10 | 11 | 12 |
| 10 | 1 | 1 | 2 | 3 | 4 | 5 | 6 | 7 | 8 | 9 | X | 10 |
| 20 | 9 | X | 10 | 1 | 1 | 2 | 3 | 4 | 5 | 6 | 7 | 8 |
| 30 | 6 | 7 | 8 | 9 | X | 10 | 1 | 1 | 2 | 3 | 4 | 5 |
| 40 | 3 | 4 | 5 | 6 | 7 | 8 | 9 | X | 10 | 1 | 1 | 2 |

Step 1—adsorption step: crude gas is introduced to the bottom gas pipe of the adsorption tower undergoing step 1, wherein the component with stronger adsorbability are removed by the adsorbent, and the component with weaker adsorbability are extracted from the top gas pipe of the adsorption tower as product gas. All of these product gases are final product gases sent to a selectable final product gas collection tank, and conveyed from there to downstream users.

Step 2—adsorption+pressurization step: crude gas continues to be introduced to the bottom gas pipe of the adsorption tower undergoing step 2, wherein the component with stronger adsorbability are removed by the adsorbent, and the component with weaker adsorbability pass through the top gas pipe of the adsorption tower as product gas. A portion of the product gas is sent to the final product gas of the selectable final product gas collection tank and from there to the downstream user, and the other portion of the product gas is introduced into the top gas pipe of another adsorption tower which undergoes a pressurization step (Step 10).

Step 3—first depressurization step: by extracting depressurization gas from the top gas pipe of the adsorption tower undergoing step 3, the adsorption tower begins to be depressurized from the pressure in step 2 until the pressure in the adsorption tower drops to a first intermediate pressure, where the depressurization gas is introduced into the top gas pipe of the adsorption tower undergoing the first pressurization step (step 9). That is to say, step 3 is the first depressurization step in which the pressure of the adsorption tower after the absorption step is reduced to the first intermediate pressure.

Step 4—purging step: by extracting purge gas from the top gas pipe of the adsorption tower, the adsorption tower is depressurized from the first intermediate pressure until the pressure in the adsorption tower drops to a second intermediate pressure, wherein the purge gas is introduced countercurrently into the top gas pipe of the adsorption tower undergoing purge regeneration (step 7). That is to say, step 4 is a purge step wherein purge gas is introduced into the adsorption tower undergoing purge regeneration (step 7).

Step 5—second depressurization step: by extracting depressurization gas from the top gas pipe of the adsorption tower undergoing step 5, the adsorption tower is depressurized from the second intermediate pressure until the pressure in the adsorption tower drops to a third intermediate pressure, where the depressurization gas is introduced into the top gas pipe of the adsorption tower undergoing the second pressurization step (step 8). That is to say, step 5 is the second depressurization step wherein the adsorption tower drops from the second intermediate pressure to the third intermediate pressure.

Step 6—reverse-discharge regeneration step: the bottom gas pipe of the adsorption tower undergoing step 6 communicates with the first exhaust channel 641, and the reverse-discharged exhaust gas in the adsorption tower is discharged from top to bottom to realize the reverse-discharge regeneration step of the adsorption tower.

Step 7—purge regeneration step: by introducing purge gas to the top gas pipe of the adsorption tower undergoing step 7, the bottom gas pipe of the adsorption tower communicates with the first exhaust channel 641 through the third arc-shaped groove 6413, the exhaust gas is purged from top to bottom to be discharged from the adsorption tower, thereby performing the purge regeneration step of the adsorption tower, wherein the purge gas is provided from the top gas pipe of the adsorption tower undergoing the purge step (step 4).

Step 8—second pressurization step: by introducing pressurization gas to the top gas pipe of the adsorption tower undergoing step 8, the adsorption tower is pressurized from the third intermediate pressure to a fourth intermediate pressure equal to or lower than the first intermediate pressure, wherein the pressurization gas is provided from the product end of the adsorption tower undergoing the second depressurization step (step 5).

Step 9—first pressurization step: by introducing pressurization gas to the top gas pipe of the adsorption tower undergoing step 9, the adsorption tower is pressurized from the fourth intermediate pressure, wherein the pressurization gas is provided from the product end of the adsorption tower undergoing the first depressurization step (step 3).

Step 10—adsorption-ready pressurization step: by introducing product gas into the top gas pipe of the adsorption tower undergoing step 10, the adsorption tower is pressurized, wherein the product gas is provided from the top gas pipe of the adsorption tower undergoing step 2. At the end of this step, the adsorption tower is ready to start step 1. Steps 1 to 10 are repeated in a circular fashion. In one example, the component with stronger adsorbability is nitrogen gas and the component with weaker adsorbability is oxygen gas. In another example, the component with stronger adsorbability is nitrogen gas and the component with weaker adsorbability is hydrogen gas. It should be understood that the present invention may be used to separate any other suitable gas mixture.

Sequence 1: the adsorption tower 10 is in step 1; the adsorption tower 20 is in step 9; the adsorption tower 30 is in step 6; the adsorption tower 40 is in step 3. The crude gas enters the crude gas valve 60 from the feed port 6311, and enters the bottom of the adsorption tower 10 through the second arc-shaped groove 6313 and the bottom gas pipe 11. After the crude gas passes through the adsorbent bed in the adsorption tower 10 from bottom to top, the impurities are adsorbed in the bed, and the purified product gas enters the through-hole through the top gas pipe 12, and enters the product gas channel 531 of the product gas valve 50 under the guidance of the first arc-shaped groove 5313 and is discharged. The adsorption tower 10 is in the adsorption step. The top gas pipe 22 of the adsorption tower 20 and the top gas pipe 42 of the adsorption tower 40 communicate through the first pressure equalization channels 541, and the adsorption tower 20 and the adsorption tower 40 perform the first pressure equalization step. The bottom gas pipe 31 of the adsorption tower 30 communicates with the first exhaust channel 641, and the reverse discharged exhaust gas in the adsorption tower 30 is discharged from top to bottom, realizing the reverse-discharge regeneration step of the adsorption tower 30.

Sequence 2: the adsorption tower 10 is in step 1; the adsorption tower 20 is in the cut-out state without performing any operation; the adsorption tower 30 is in step 6; the adsorption tower 40 is in step 3. The adsorption tower 10 is still in the adsorption step. The top gas pipe 32 of the adsorption tower 30 and the top gas pipe 42 of the adsorption tower 40 communicate through the first pressure equalization channels 543, and the bottom gas pipe 31 of the adsorption tower 30 communicates with the first exhaust channel 641 through the third arc-shaped groove 6413. The purge exhaust gas is discharged from the adsorption tower 30 from top to bottom, and the adsorption tower 40 performs the purge regeneration step of the adsorption tower 30.

Sequence 3: the adsorption tower 10 is in step 2; the adsorption tower 20 is in step 9; the adsorption tower 30 is in step 6; the adsorption tower 40 is in step 3. The adsorption tower 10 is still in the adsorption step. Simultaneously, the top gas pipe 12 of the adsorption tower 10 communicates with the top gas pipe 22 of the adsorption tower 20 through the first arc-shaped groove 5313, and the adsorption tower 10 pressurizes the adsorption tower 20. In this process, the adsorption tower 20 is pressurized to the adsorption pressure, ready to receive crude gas. The top pipe 32 of the adsorption tower 30 communicates with the top pipe 42 of the adsorption tower 40 through the first pressure equalization channels 542, and the adsorption tower 30 and the adsorption tower 40 performs the second pressure equalization step.

Sequence 4: the adsorption tower 10 is in step 3; the adsorption tower 20 is in step 1; the adsorption tower 30 is in step 9; the adsorption tower 40 is in step 6. The crude gas enters the crude gas valve 60 from the feed port 6311, and enters the bottom of the adsorption tower 20 through the second arc-shaped groove 6313 and the bottom gas pipe 21. After the crude gas passes through the adsorbent bed in the adsorption tower 20 from bottom to top, the impurities are adsorbed in the bed, and the purified product gas enters the product gas valve 50 through the top gas pipe 22 from the first arc-shaped groove 5313 and is discharged from the product gas channel 531. The adsorption tower 20 is in the adsorption step. The top gas pipe 32 of the adsorption tower 30 and the top gas pipe 12 of the adsorption tower 10 communicate through the first pressure equalization channels 541, and the adsorption tower 30 and the adsorption tower 10 perform the first pressure equalization step. The bottom gas pipe 41 of the adsorption tower 40 communicates with the first exhaust channel 641, and the reverse discharged exhaust gas in the adsorption tower 40 is discharged from top to bottom, realizing the reverse-discharge regeneration step of the adsorption tower 40.

Sequence 5: the adsorption tower 10 is in step 4; the adsorption tower 20 is in step 1; the adsorption tower 30 is in a cut-out state without performing any operation; the adsorption tower 40 is in step 7. The adsorption tower 20 is still in the adsorption step. The top gas pipe 12 of the adsorption tower 10 and the top gas pipe 42 of the adsorption tower 40 communicate through the first pressure equalization channels 543, and the bottom gas pipe 41 of the adsorption tower 40 communicates with the first exhaust channel 641 through the third arc-shaped groove 6413. The purge exhaust gas is discharged from the adsorption tower 40 from top to bottom, and the adsorption tower 10 performs the purge regeneration step of the adsorption tower 40.

Sequence 6: the adsorption tower 10 is in step 5; the adsorption tower 20 is in step 2; the adsorption tower 30 is in step 10; the adsorption tower 40 is in step 8. The adsorption tower 20 is still in the adsorption step. Simultaneously, the top gas pipe 22 of the adsorption tower 20 communicates with the top gas pipe 32 of the adsorption tower 30 through the first arc-shaped groove 5313, and the adsorption tower 20 pressurizes the adsorption tower 30, and in this process, the adsorption tower 30 is pressurized to the adsorption pressure, ready to receive crude gas. The top pipe 12 of the adsorption tower 10 communicates with the top pipe 42 of the adsorption tower 40 through the first pressure equalization channels 542, and the adsorption tower 10 and the adsorption tower 40 perform the second pressure equalization step.

Sequence 7: the adsorption tower 10 is in step 6; the adsorption tower 20 is in step 3; the adsorption tower 30 is in step 1; the adsorption tower 40 is in step 9. The crude gas enters the crude gas valve 60 from the feed port 6311, and enters the bottom of the adsorption tower 30 through the second arc-shaped groove 6313 and the bottom gas pipe 31. After the crude gas passes through the adsorbent bed in the adsorption tower 30 from bottom to top, the impurities are adsorbed in the bed, and the purified product gas enters the through-hole through the top gas pipe 32, and enters the product gas channel 531 of the product gas valve 50 under the guidance of the first arc-shaped groove 5313 and is discharged. The adsorption tower 30 is in the adsorption step. The top gas pipe 22 of the adsorption tower 20 and the top gas pipe 42 of the adsorption tower 40 communicate through the first pressure equalization channels 541, and the adsorption tower 20 and the adsorption tower 40 perform the first pressure equalization step. The bottom gas pipe 11 of the adsorption tower 10 communicates with the first exhaust channel 641, and the reverse discharged exhaust gas in the adsorption tower 10 is discharged from top to bottom, realizing the reverse-discharge regeneration step of the adsorption tower 10.

Sequence 8: the adsorption tower 10 is in step 7; the adsorption tower 20 is in step 4; the adsorption tower 30 is in step 1; the adsorption tower 40 is in the cut-out state without performing any operation. The adsorption tower 30 is still in the adsorption step. The top gas pipe 22 of the adsorption tower 20 communicates with the top gas pipe 12 of the adsorption tower 10 through the first pressure equalization channels 543, and the bottom gas pipe 11 of the adsorption tower 10 communicates with the first exhaust channel 641 through the third arc-shaped groove 6413. The purge exhaust gas is discharged from the adsorption tower 10 from top to bottom, and the adsorption tower 20 performs the purge regeneration step of the adsorption tower 10.

Sequence 9: the adsorption tower 10 is in step 8; the adsorption tower 20 is in step 5; the adsorption tower 30 is in step 2; the adsorption tower 40 is in step 10. The adsorption tower 30 is still in the adsorption step. Simultaneously, the top gas pipe 32 of the adsorption tower 30 communicates with the top gas pipe 42 of the adsorption tower 40 through the first arc-shaped groove 5313, and the adsorption tower 30 pressurizes the adsorption tower 40. In this process, the adsorption tower 40 is pressurized to the adsorption pressure, ready to receive crude gas. The top pipe 12 of the adsorption tower 10 communicates with the top pipe 22 of the adsorption tower 20 through the first pressure equalization channels 542, and the adsorption tower 10 and the adsorption tower 20 perform the second pressure equalization step.

Sequence 10: the adsorption tower 10 is in step 9; the adsorption tower 20 is in step 6; the adsorption tower 30 is in step 3; the adsorption tower 40 is in step 1. The crude gas enters the crude gas valve 60 from the feed port 6311, and enters the bottom of the adsorption tower 40 through the second arc-shaped groove 6313 and the bottom gas pipe 41. After the crude gas passes through the adsorbent bed in the adsorption tower 40 from bottom to top, the impurities are adsorbed in the bed, and the purified product gas enters the product gas valve 50 through the first arc-shaped groove 5313 and is discharged from the product gas channel 531. The adsorption tower 40 is in the adsorption step. The top gas pipe 32 of the adsorption tower 30 and the top gas pipe 12 of the adsorption tower 10 communicate through the first pressure equalization channels 541, and the adsorption tower 30 and the adsorption tower 10 perform the first pressure equalization step. The bottom gas pipe 21 of the adsorption tower 20 communicates with the first exhaust channel 641, and the reverse discharged exhaust gas in the adsorption tower 20 is discharged from top to bottom, realizing the reverse-discharge regeneration step of the adsorption tower 20.

Sequence 11: the adsorption tower 10 is in cut-out state without performing any operation; the adsorption tower 20 is in step 7; the adsorption tower 30 is in step 4; the adsorption tower 40 is in step 1. The adsorption tower 40 is still in the adsorption step. The top gas pipe 22 of the adsorption tower 20 and the top gas pipe 32 of the adsorption tower 30 communicate through the first pressure equalization channels 543, and the bottom gas pipe 21 of the adsorption tower 20 communicates with the first exhaust channel 641 through the third arc-shaped groove 6413. The purge exhaust gas is discharged from the adsorption tower 20 from top to bottom, and the adsorption tower 30 performs the purge regeneration step of the adsorption tower 20.

Sequence 12: the adsorption tower 10 is in step 10; the adsorption tower 20 is in step 8; the adsorption tower 30 is in step 5; the adsorption tower 40 is in step 2. The adsorption tower 40 is still in the adsorption step. Simultaneously, the top gas pipe 42 of the adsorption tower 40 communicates with the top gas pipe 12 of the adsorption tower 10 through the first arc-shaped groove 5313, and the adsorption tower 40 pressurizes the adsorption tower 10. In this process, the adsorption tower 10 is pressurized to the adsorption pressure, ready to receive crude gas. The top pipe 22 of the adsorption tower 20 communicates with the top pipe 32 of the adsorption tower 30 through the first pressure equalization channels 542, and the adsorption tower 20 and the adsorption tower 30 perform the second pressure equalization step.

Figure 7:
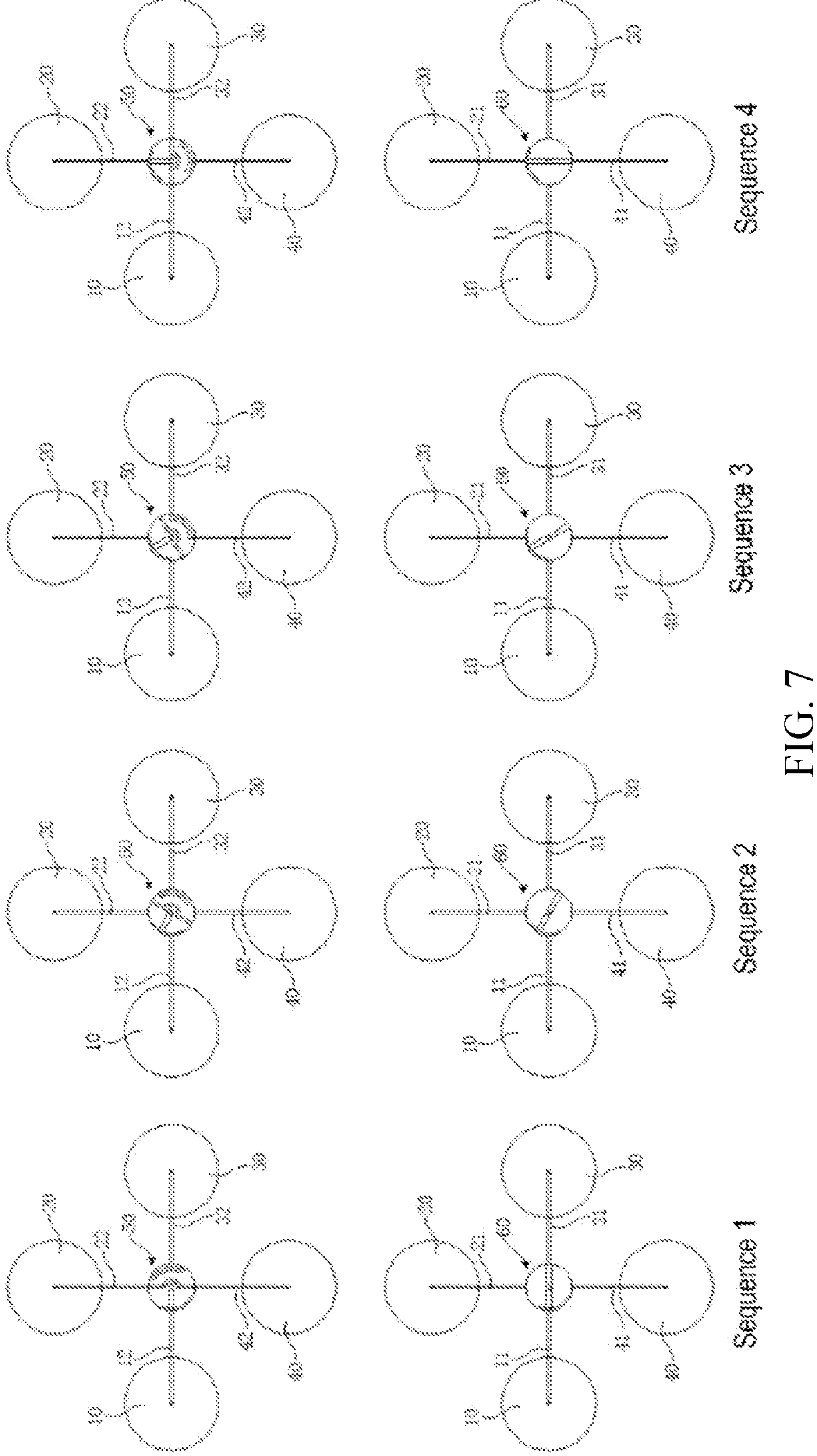
FIG. 7 is a schematic diagram of the working process of the pressure swing adsorption device according to one embodiment of the present invention, wherein the pressure swing adsorption device is switched to the second process sequence, and structures of the valve sleeve of the product gas valve and the crude gas valve are not shown.
Figure 8:
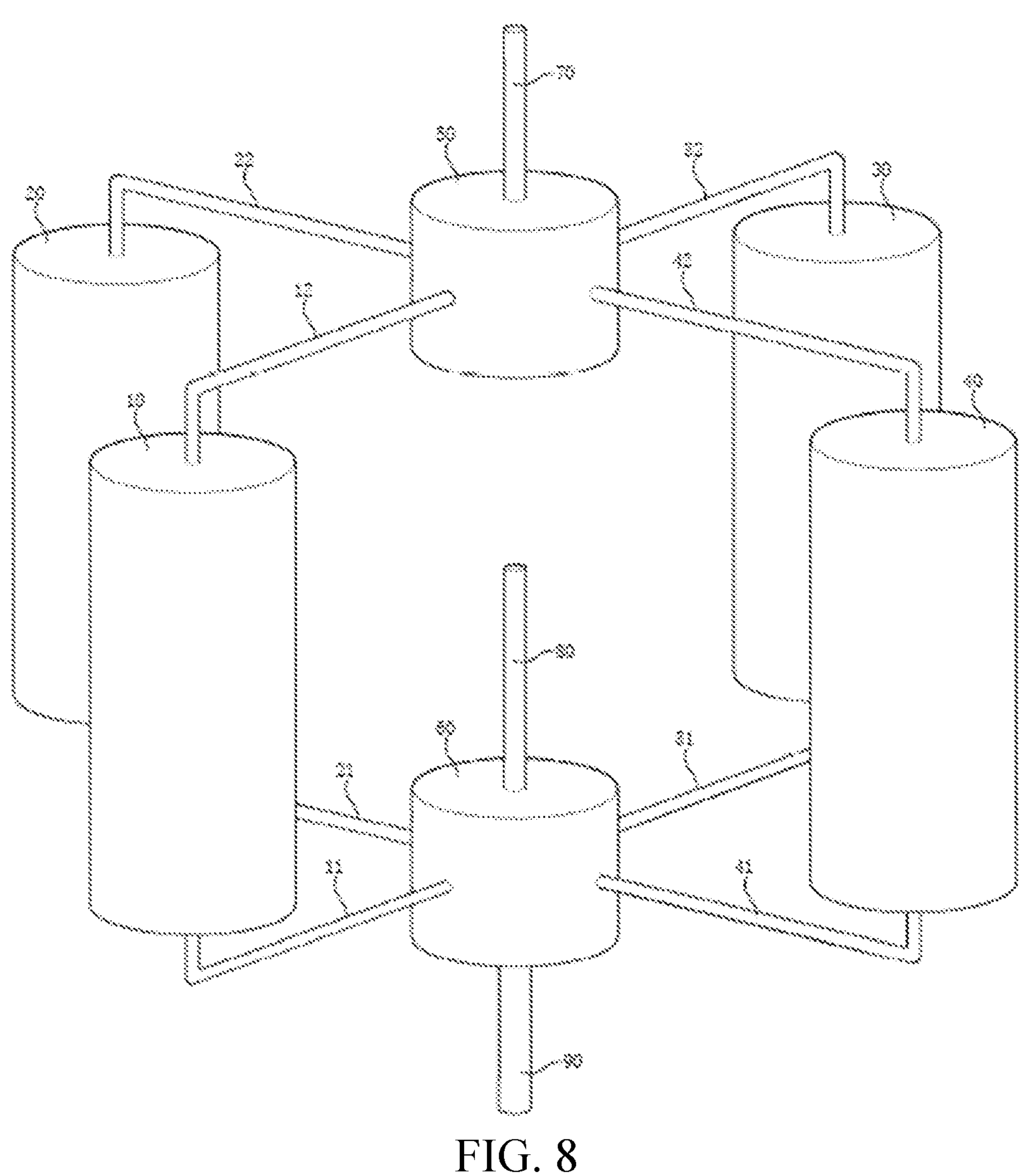
FIG. 8 is a schematic perspective view of a pressure swing adsorption device according to one embodiment of the present invention.

The working process of the pressure swing adsorption device of this embodiment using the second process sequence will be described below with reference to FIG. 7 and Table 2.

The switching valve 522 of the product gas valve 50 causes the product gas channel 531 and the second pressure equalization channels 551 and 552 to be in the working state, and the switching valve 622 of the crude gas valve 60 causes the crude gas channel 631 and the second exhaust channel 651 to be in the working state. Each adsorption tower undergoes the steps of adsorption, first pressure equalization, second pressure equalization, reverse-discharge regeneration and pressurization in one process cycle of the second process sequence. The valve body 51 of the product gas valve 50 and the valve body 61 of the crude gas valve 60 rotate synchronously in the clockwise direction with a sequence interval of 30°.

TABLE 2

Steps of each adsorption tower 10, 20, 30, 40 in each sequence of the second process sequence

| adsorption | sequence | | | | | | | | | | | |
|---|---|---|---|---|---|---|---|---|---|---|---|---|
| tower | 1 | 2 | 3 | 4 | 5 | 6 | 7 | 8 | 9 | 10 | 11 | 12 |
| 10 | 1 | 1 | 2 | 3 | X | 4 | 5 | X | 6 | 7 | X | 8 |
| 20 | 7 | X | 8 | 1 | 1 | 2 | 3 | X | 4 | 5 | X | 6 |
| 30 | 5 | X | 6 | 7 | X | 8 | 1 | 1 | 2 | 3 | x | 4 |
| 40 | 3 | x | 4 | 5 | x | 6 | 7 | x | 8 | 1 | 1 | 2 |

Step 1—adsorption step: crude gas is introduced to the bottom gas pipe of the adsorption tower undergoing step 1, wherein the component with stronger adsorbability are removed by the adsorbent, and the component with weaker adsorbability are extracted from the top gas pipe of the adsorption tower as product gas. All of these product gases are final product gases sent to a selectable final product gas collection tank, and conveyed from there to downstream users.

Step 2—adsorption+pressurization step: crude gas continues to be introduced to the bottom gas pipe of the adsorption tower undergoing step 2, wherein the component with stronger adsorbability are removed by the adsorbent, and the component with weaker adsorbability pass through the top gas pipe of the adsorption tower as product gas. A portion of the product gas is sent to the final product gas of the selectable final product gas collection tank and from there to the downstream user, and the other portion of the product gas is introduced into the top gas pipe of another adsorption tower which undergoes a pressurization step (Step 8).

Step 3—first depressurization step: by extracting depressurization gas from the top gas pipe of the adsorption tower undergoing step 3, the adsorption tower begins to be depressurized from the pressure in step 2 until the pressure in the adsorption tower drops to a first intermediate pressure, where the depressurization gas is introduced into the top gas pipe of the adsorption tower undergoing the first pressurization step (step 7). That is to say, step 3 is the first depressurization step in which the pressure of the adsorption tower after the absorption step is reduced to the first intermediate pressure.

Step 4—second depressurization step: by extracting depressurization gas from the top gas pipe of the adsorption tower undergoing step 4, the adsorption tower is depressurized from the second intermediate pressure until the pressure in the adsorption tower drops to a third intermediate pressure, where the depressurization gas is introduced into the top gas pipe of the adsorption tower undergoing the second pressurization step (step 6). That is to say, step 4 is the second depressurization step wherein the adsorption tower drops from the second intermediate pressure to the third intermediate pressure.

Step 5—reverse-discharge regeneration step: the bottom gas pipe of the adsorption tower undergoing step 5 communicates with the first exhaust channel 641, and the reverse-discharged exhaust gas in the adsorption tower is discharged from top to bottom to realize the reverse-discharge regeneration step of the adsorption tower.

Step 6—second pressurization step: by introducing pressurization gas to the top gas pipe of the adsorption tower undergoing step 6, the adsorption tower is pressurized from the third intermediate pressure to a fourth intermediate pressure equal to or lower than the first intermediate pressure, wherein the pressurization gas is provided from the product end of the adsorption tower undergoing the second depressurization step (step 4).

Step 7—first pressurization step: by introducing pressurization gas to the top gas pipe of the adsorption tower undergoing step 7, the adsorption tower is pressurized from the fourth intermediate pressure, wherein the pressurization gas is provided from the product end of the adsorption tower undergoing the first depressurization step (step 3).

Step 8—adsorption-ready pressurization step: by introducing product gas into the top gas pipe of the adsorption tower undergoing step 8, the adsorption tower is pressurized, wherein the product gas is provided from the top gas pipe of the adsorption tower undergoing step 2. At the end of this step, the adsorption tower is ready to start step 1. Steps 1 to 8 are repeated in a circular fashion. In one example, the component with stronger adsorbability is nitrogen gas and the component with weaker adsorbability is oxygen gas. In another example, the component with stronger adsorbability is nitrogen gas and the component with weaker adsorbability is hydrogen gas. It should be understood that the present invention may be used to separate any other suitable gas mixture.

Sequence 1: the adsorption tower 10 is in step 1; the adsorption tower 20 is in step 7; the adsorption tower 30 is in step 5; the adsorption tower 40 is in step 3. The crude gas enters the crude gas valve 60 from the feed port 6311, and enters the bottom of the adsorption tower 10 through the second arc-shaped groove 6313 and the bottom gas pipe 11. After the crude gas passes through the adsorbent bed in the adsorption tower 10 from bottom to top, impurities are adsorbed in the bed, and the purified product gas enters the product gas valve 50 through the first arc-shaped groove 5313 and is discharged from the product gas channel 531. The adsorption tower 10 is in the adsorption step. The top gas pipe 22 of the adsorption tower 20 and the top gas pipe 42 of the adsorption tower 40 communicate through the second pressure equalization channels 551, and the adsorption tower 20 and the adsorption tower 40 perform the first pressure equalization step. The bottom gas pipe 31 of the adsorption tower 30 communicates with the second exhaust channel 651, and the reverse discharged exhaust gas in the adsorption tower 30 is discharged from top to bottom, realizing the reverse-discharge regeneration step of the adsorption tower 30.

Sequence 2: the adsorption tower 10 is in step 1. The adsorption tower 10 is still in the adsorption step. The adsorption towers 20, 30 and 40 are all in cut-off state without performing any operation.

Sequence 3: the adsorption tower 10 is in step 2; the adsorption tower 20 is in step 8; the adsorption tower 30 is in step 6; the adsorption tower 40 is in step 4. The adsorption tower 10 is still in the adsorption step. Simultaneously, the top gas pipe 12 of the adsorption tower 10 communicates with the top gas pipe 22 of the adsorption tower 20 through the first arc-shaped groove 5313, and the adsorption tower 10 pressurizes the adsorption tower 20. In this process, the adsorption tower 20 is pressurized to the adsorption pressure, ready to receive crude gas. The top pipe 32 of the adsorption tower 30 communicates with the top pipe 42 of the adsorption tower 40 through the second pressure equalization channels 552, and the adsorption tower 30 and the adsorption tower 40 perform the second pressure equalization step.

Sequence 4: the adsorption tower 10 is in step 3; the adsorption tower 20 is in step 1; the adsorption tower 30 is in step 7; the adsorption tower 40 is in step 5. The crude gas enters the crude gas valve 60 from the feed port 6311, and enters the bottom of the adsorption tower 20 through the second arc-shaped groove 6313 and the bottom gas pipe 21. After the crude gas passes through the adsorbent bed in the adsorption tower 20 from bottom to top, the impurities are adsorbed in the bed, and the purified product gas enters the product gas valve 50 through the first arc-shaped groove 5313 and is discharged from the product gas channel 531. The adsorption tower 20 is in the adsorption step. The top gas pipe 32 of the adsorption tower 30 and the top gas pipe 12 of the adsorption tower 10 communicate through the second pressure equalization channels 551, and the adsorption tower 30 and the adsorption tower 10 perform the first pressure equalization step. The bottom gas pipe 41 of the adsorption tower 40 communicates with the second exhaust channel 651, and the reverse discharged exhaust gas in the adsorption tower 40 is discharged from top to bottom, realizing the reverse-discharge regeneration step of the adsorption tower 40.

Sequence 5: the adsorption tower 20 is in step 1. The adsorption tower 20 is still in the adsorption step. The adsorption towers 10, 30 and 40 are all in cut-off state without performing any operation.

Sequence 6: the adsorption tower 10 is in step 4; the adsorption tower 20 is in step 2; the adsorption tower 30 is in step 8; the adsorption tower 40 is in step 6. The adsorption tower 20 is still in the adsorption step. Simultaneously, the top gas pipe 22 of the adsorption tower 20 communicates with the top gas pipe 32 of the adsorption tower 30 through the first arc-shaped groove 5313, and the adsorption tower 20 pressurizes the adsorption tower 30, and in this process, the adsorption tower 30 is pressurized to the adsorption pressure, ready to receive crude gas. The top pipe 12 of the adsorption tower 10 communicates with the top pipe 42 of the adsorption tower 40 through the second pressure equalization channels 552, and the adsorption tower 10 and the adsorption tower 40 perform the second pressure equalization step.

Sequence 7: the adsorption tower 10 is in step 5; the adsorption tower 20 is in step 3; the adsorption tower 30 is in step 1; the adsorption tower 40 is in step 7. The crude gas enters the crude gas valve 60 from the feed port 6311, and enters the bottom of the adsorption tower 30 through the second arc-shaped groove 6313 and the bottom gas pipe 31. After the crude gas passes through the adsorbent bed in the adsorption tower 30 from bottom to top, impurities are adsorbed in the bed, and the purified product gas enters the product gas valve 50 through the first arc-shaped groove 5313 and is discharged from the product gas channel 531. The adsorption tower 30 is in the adsorption step. The top gas pipe 22 of the adsorption tower 20 and the top gas pipe 42 of the adsorption tower 40 communicate through the second pressure equalization channels 551, and the adsorption tower 20 and the adsorption tower 40 perform the first pressure equalization step. The bottom gas pipe 11 of the adsorption tower 10 communicates with the second exhaust channel 651, and the reverse discharged exhaust gas in the adsorption tower 10 is discharged from top to bottom, realizing the reverse-discharge regeneration step of the adsorption tower 10.

Sequence 8: the adsorption tower 30 is in step 1. The adsorption tower 30 is still in the adsorption step. The adsorption towers 10, 20 and 40 are all in cut-out state without performing any operation.

Sequence 9: the adsorption tower 10 is in step 6; the adsorption tower 20 is in step 4; the adsorption tower 30 is in step 2; the adsorption tower 40 is in step 8. The adsorption tower 30 is still in the adsorption step. Simultaneously, the top gas pipe 32 of the adsorption tower 30 communicates with the top gas pipe 42 of the adsorption tower 40 through the first arc-shaped groove 5313, and the adsorption tower 30 pressurizes the adsorption tower 40. In this process, the adsorption tower 40 is pressurized to the adsorption pressure, ready to receive crude gas. The top pipe 12 of the adsorption tower 10 communicates with the top pipe 22 of the adsorption tower 20 through the second pressure equalization channels 552, and the adsorption tower 10 and the adsorption tower 20 perform the second pressure equalization step.

Sequence 10: the adsorption tower 10 is in step 7; the adsorption tower 20 is in step 5; the adsorption tower 30 is in step 3; the adsorption tower 40 is in step 1. The crude gas enters the crude gas valve 60 from the feed port 6311, and enters the bottom of the adsorption tower 40 through the second arc-shaped groove 6313 and the bottom gas pipe 41. After the crude gas passes through the adsorbent bed in the adsorption tower 40 from bottom to top, impurities are adsorbed in the bed, and the purified product gas enters the product gas valve 50 through the first arc-shaped groove 5313 and is discharged from the product gas channel 531. The adsorption tower 40 is in the adsorption step. The top gas pipe 32 of the adsorption tower 30 and the top gas pipe 12 of the adsorption tower 10 communicate through the second pressure equalization channels 551, and the adsorption tower 30 and the adsorption tower 10 perform the first pressure equalization step. The bottom gas pipe 21 of the adsorption tower 20 communicates with the second exhaust channel 651, and the reverse discharged exhaust gas in the adsorption tower 20 is discharged from top to bottom, realizing the reverse-discharge regeneration step of the adsorption tower 20.

Sequence 11: the adsorption tower 40 is in step 1. The adsorption tower 40 is still in the adsorption step. The adsorption towers 10, 20 and 30 are all in cut-out state without performing any operation.

Sequence 12: the adsorption tower 10 is in step 8; the adsorption tower 20 is in step 6; the adsorption tower 30 is in step 4; the adsorption tower 40 is in step 2. The adsorption tower 40 is still in the adsorption step. Simultaneously, the top gas pipe 42 of the adsorption tower 40 communicates with the top gas pipe 12 of the adsorption tower 10 through the first arc-shaped groove 5313, and the adsorption tower 40 pressurizes the adsorption tower 10. In this process, the adsorption tower 10 is pressurized to the adsorption pressure, ready to receive crude gas. The top pipe 22 of the adsorption tower 20 communicates with the top pipe 32 of the adsorption tower 30 through the second pressure equalization channels 552, and the adsorption tower 20 and the adsorption tower 30 perform the second pressure equalization step.

The pressure swing adsorption device of this embodiment can be switched to a suitable process sequence according to actual project needs, and the process sequence can be switched online according to on-site conditions such as crude gas fluctuations, without shutting down, thereby ensuring production flexibility. The second process sequence has no purge step and corresponding purge regeneration step. When the crude gas has more heavy components, it is switched to the first process sequence, and when the crude gas component is better (that is, less heavy components), it is switched to the second process sequence. When the valve block of the product gas valve corresponding to a certain process sequence needs to be replaced or repaired, online operation can also be realized, which improves the online operation rate and production efficiency of the rotary valve and ensures the continuous operation of long-term projects.

The preferred embodiments of the present invention have been described in detail above with reference to the accompanying drawings, however, the present invention is not limited thereto. Within the scope of the technical concept of the present invention, various simple modifications can be made to the technical solution of the present invention, including combinations of respective specific technical features in any suitable manner. In order to avoid unnecessary repetition, various possible combinations are not further described in the present invention. However, these simple modifications and combinations should also be regarded as the content disclosed by the present invention, and all belong to the protection scope of the present invention.

The invention claimed is:

1. A rotary valve comprising:

a valve body provided with a first group of flow channels, a second group of flow channels, and a third group of flow channels, wherein ports of the first group of flow channels, ports of the second group of flow channels, and ports of the third group of flow channels are disposed on a surface of the valve body, the valve body is a cylindrical structure and defines a rotation axis extending along a vertical direction; and a valve sleeve sleeved coaxially hermetically outside the valve body along the rotation axis, wherein the valve sleeve comprises a plurality of through-holes, and an inner end of each through-hole is provided with a vertical groove extending up and down along an inner wall of the valve sleeve, the vertical groove is divided into three sections along the vertical direction, which communicate with the ports of the first group of flow channels, the ports of the second group of flow channels, and the ports of the third group of flow channels, respectively, wherein the first group of flow channels are always in a working state, a switching valve is provided at each of the plurality of through-holes, and the switching valve switches one of the second group of flow channels and the third group of flow channels into the working state, the valve body rotates around the rotation axis relative to the valve sleeve, so that the plurality of through-holes communicate with the ports of the one of the second group of flow channels and the third group of flow channels that is in the working state and the first group of flow channels by means of a predetermined combination to carry out a plurality of process sequences, and each through-hole communicates with ports of the first group of flow channels, and one of the second group of flow channels and the third group of flow channels.

2. The rotary valve according to claim 1, wherein the second group of flow channels includes a plurality of flow channels, and the third group of flow channels includes a plurality of flow channels.

3. The rotary valve according to claim 1, wherein the valve body is composed of at least two valve blocks that are detachably connected, and the second group of flow channels and the third group of flow channels are arranged in two or more valve blocks in the valve body.

4. The rotary valve according to claim 1, wherein the second group of flow channels and the third group of flow channels correspond to the same or different process sequences.

5. The rotary valve according to claim 1, wherein one port of the first group of flow channels is located at the center of the top surface of the valve body, and the other another port of the first group of flow channels is located on the sidewall of the valve body and is provided with an arc-shaped groove extending horizontally along the outer sidewall of the valve body.

6. A pressure swing adsorption device, comprising:

a crude gas valve which is the rotary valve according to claim 1, ports of the crude gas valve include a feed port arranged at the center of the top surface and a discharge port arranged at the center of the bottom surface;

a product gas valve which is the rotary valve according to claim 1, ports of the product gas valve include a product gas port that is arranged at the center of top surface, and a valve body of the product gas valve and a valve body of the crude gas valve rotate synchronously according to a predetermined sequence; and a plurality of adsorption towers with bottom gas pipes and top gas pipes, the bottom gas pipes communicate respectively with through-holes of the crude gas valve, and the top gas pipes communicate respectively with through-holes of the product gas valve.

7. The pressure swing adsorption device according to claim 6, wherein:

the first group of flow channels of the product gas valve is a product gas channel, one port of which is the product gas port, and the other port is located on the sidewall of the valve body of the product gas valve and is provided with a first arc-shaped groove extending horizontally along the outer sidewall of the valve body of the product gas valve, the first arc-shaped groove is used to guide the product gas of corresponding adsorption tower to flow between the product gas port and the through-hole aligned with the first arc-shaped groove;

the second group of flow channels of the product gas valve are first pressure equalization channels, both ports of which are arranged on the sidewall of the valve body of the product gas valve, and the first pressure equalization channels are used to guide the product gas to flow between two through-holes aligned with the two ports of the first pressure equalization channels; and the third group of flow channels of the product gas valve are second pressure equalization channels, both ports of which are arranged on the sidewall of the valve body of the product gas valve, and the second pressure equalization channels are used to guide the product gas to flow between two through-holes aligned with the two ports of the second pressure equalization channels.

8. The pressure swing adsorption device according to claim 7, wherein the number of the first pressure equalization channels is 2 to 10, and the angle between adjacent first pressure equalization channels is 10° to 45°; the number of the second pressure equalization channels is 2 to 10, the angle between the adjacent second pressure equalization channels is 10° to 45°; and the arrangement of the first pressure equalization channels is the same as or different from the arrangement of the second pressure equalization channels.

9. The pressure swing adsorption device according to claim 7, wherein the valve body of the product gas valve is composed of an upper valve block, a middle valve block and a lower valve block, the product gas channel is arranged in the middle valve block and passes through the upper valve block, the first pressure equalization channels and the second pressure equalization channels are respectively arranged in the upper valve block and the lower valve block, and the upper valve block and the lower valve block are detachably connected with the middle valve block.

10. The pressure swing adsorption device according to claim 7, wherein:

the first group of flow channels of the crude gas valve is a crude gas channel, one port of which is the feed port, and the other port is located on the sidewall of the valve body and is provided with a second arc-shaped groove extending horizontally along the outer sidewall of the valve body of the crude gas valve, the second arc-shaped groove is used to guide the feed gas flow into the through-hole aligned with the second arc-shaped groove, the second arc-shaped groove has the same radian as the first arc-shaped groove and is vertically opposite to the first arc-shaped groove;

the second group of flow channels of the crude gas valve is a first exhaust channel, one port of which is the discharge port, and the other port is a first exhaust gas inlet located on the sidewall of the valve body of the crude gas valve, the first exhaust channel is used to guide exhaust gas from the through-hole aligned with the first exhaust gas inlet to the discharge port; and the third group of flow channels of the crude gas valve is a second exhaust channel, which forms an F-shape with the first exhaust channel, one port of the second exhaust channel is the discharge port, and the other port is a second exhaust gas inlet located on the sidewall of the valve body of the crude gas valve, and the second exhaust channel is used to guide the exhaust gas from the through-hole aligned with the second exhaust gas inlet to the discharge port.

11. The pressure swing adsorption device according to claim 10, wherein the first exhaust gas inlet and/or the second exhaust gas inlet are provided with a third arc-shaped groove extending horizontally along the outer sidewall of the valve body of the crude gas valve, and the third arc-shaped groove is used to guide the exhaust gas from the through-hole aligned with the third arc-shaped groove to discharge port.

12. The pressure swing adsorption device according to claim 10, wherein the radians of the first arc-shaped groove and the second arc-shaped groove are $\pi/6$ to $5\pi/6$.

13. The pressure swing adsorption device according to claim 6, wherein the number of the adsorption towers is greater than or equal to 4.

14. The pressure swing adsorption device according to claim 6, wherein the predetermined sequence is a process sequence of pressure swing adsorption.

15. The pressure swing adsorption device according to claim 6, wherein the valve body of the product gas valve and the valve body of the crude gas valve rotate at a constant speed or a stepped speed.

16. A method for recovering component with weaker adsorbability from a gas mixture using the pressure swing adsorption device according to claim 10, the plurality of adsorption towers comprising a first adsorption tower, a second adsorption tower, a third adsorption tower and a fourth adsorption tower, the method can be selectively operated in one of a first process sequence and a second process sequence.

17. The method according to claim 16, wherein when the switching valve of the crude gas valve causes the second group of flow channels of the crude gas valve to be in the working state and the switching valve of the product gas valve causes the second group of flow channels of the product gas valve to be in the working state, the method is operated in the first process sequence;

the first process sequence includes the following sequences:

Sequence 1: the first adsorption tower is in an adsorption step, the second adsorption tower is in a first pressurization step, the third adsorption tower is in a reverse-discharge regeneration step, and the fourth adsorption tower is in a first depressurization step;

Sequence 2: the first adsorption tower is in the adsorption step, the second adsorption tower is in a cut-out state without performing any operation, the third adsorption tower is in a purge regeneration step, and the fourth adsorption tower is in a purge step;

Sequence 3: the first adsorption tower is in an adsorption+pressurization step, the second adsorption tower is in an adsorption-ready pressurization step, the third adsorption tower is in a second pressurization step, and the fourth adsorption tower is in a second depressurization step;

Sequence 4: the first adsorption tower is in the first depressurization step, the second adsorption tower is in the adsorption step, the third adsorption tower is in the first pressurization step, and the fourth adsorption tower is in the reverse-discharge regeneration step;

Sequence 5: the second adsorption tower is in the adsorption step, the third adsorption tower is in the cut-out state without performing any operation, the fourth adsorption tower is in the purge regeneration step, and the first adsorption tower is in the purge step;

Sequence 6: the first adsorption tower is in the second depressurization step, the second adsorption tower is in the adsorption+pressurization step, the third adsorption tower is in the adsorption-ready pressurization step, and the fourth adsorption tower is in the second pressurization step;

Sequence 7: the first adsorption tower is in the reverse-discharge regeneration step, the second adsorption tower is in the first depressurization step, the third adsorption tower is in the adsorption step, and the fourth adsorption tower is in the first pressurization step;

Sequence 8: the third adsorption tower is in the adsorption step, the fourth adsorption tower is in the cut-out state without performing any operation, the first adsorption tower is in the purge regeneration step, and the second adsorption tower is in the purge step;

Sequence 9: the first adsorption tower is in the second pressurization step, the second adsorption tower is in the second depressurization step, the third adsorption tower is in the adsorption+pressurization step, and the fourth adsorption tower is in the adsorption-ready pressurization step;

Sequence 10: the first adsorption tower is in the first pressurization step, the second adsorption tower is in the reverse-discharge regeneration step, the third adsorption tower is in the first depressurization step, and the fourth adsorption tower is in the adsorption step;

Sequence 11: the fourth adsorption tower is in the adsorption step, the first adsorption tower is in the cut-out state without performing any operation, the second adsorption tower is in the purge regeneration step, and the third adsorption tower is in the purge step; and Sequence 12: the first adsorption tower is in the adsorption-ready pressurization step, the second adsorption tower is in the second pressurization step, the third adsorption tower is in the second depressurization step, and the fourth adsorption tower is in the adsorption+pressurization step.

18. The method according to claim 16, wherein when the switching valve of the crude gas valve causes the third group of flow channels of the crude gas valve to be in the working state and the switching valve of the product gas valve causes the third group of flow channels of the product gas valve to be in the working state, the method is operated in the second process sequence;

the second process sequence includes the following sequences:

Sequence 1: the first adsorption tower is in an adsorption step, the second adsorption tower is in a first pressurization step, the third adsorption tower is in a reverse-discharge regeneration step, and the fourth adsorption tower is in a first depressurization step;

Sequence 2: the first adsorption tower is in the adsorption step, the second adsorption tower, the third adsorption tower and the fourth adsorption tower are all in a cut-out state without performing any operation;

Sequence 3: the first adsorption tower is in an adsorption+pressurization step, the second adsorption tower is in an adsorption-ready pressurization step, the third adsorption tower is in a second pressurization step, and the fourth adsorption tower is in a second depressurization step;

Sequence 4: the first adsorption tower is in the first depressurization step, the second adsorption tower is in the adsorption step, the third adsorption tower is in the first pressurization step, and the fourth adsorption tower is in a reverse-discharge regeneration step;

Sequence 5: the second adsorption tower is in the adsorption step, the first adsorption tower, the third adsorption tower and the fourth adsorption tower are all in the cut-out state without performing any operation;

Sequence 6: the first adsorption tower is in the second depressurization step, the second adsorption tower is in the adsorption+pressurization step, the third adsorption tower is in the adsorption-ready pressurization step, and the fourth adsorption tower is in the second pressurization step;

Sequence 7: the first adsorption tower is in the reverse-discharge regeneration step, the second adsorption tower is in the first depressurization step, the third adsorption tower is in the adsorption step, and the fourth adsorption tower is in the first pressurization step;

Sequence 8: the third adsorption tower is in the adsorption step, the first adsorption tower, the second adsorption tower and the fourth adsorption tower are all in the cut-out state without performing any operation;

Sequence 9: the first adsorption tower is in the second pressurization step, the second adsorption tower is in the second depressurization step, the third adsorption tower is in the adsorption+pressurization step, and the fourth adsorption tower is in the adsorption-ready pressurization step;

Sequence 10: the first adsorption tower is in the first pressurization step, the second adsorption tower is in the reverse-discharge regeneration step, the third adsorption tower is in the first depressurization step, and the fourth adsorption tower is in the adsorption step;

Sequence 11: the fourth adsorption tower is in the adsorption step, the first adsorption tower, the second adsorption tower and the third adsorption tower are all in the cut-out state without performing any operation;

Sequence 12: the first adsorption tower is in the adsorption-ready pressurization step, the second adsorption tower is in the second pressurization step, the third adsorption tower is in the second depressurization step, and the fourth adsorption tower is in the adsorption+pressurization step.

* * * * *